United States Patent [19]

Watts et al.

[11] Patent Number: 4,904,753

[45] Date of Patent: Feb. 27, 1990

[54] ACID/OXIDIZER CATALYST SYSTEM FOR STORAGE STABLE, QUICK-CURE PHENOLIC RESINS OF THE RESOLE OR BENZYLIC ETHER RESOLE TYPE

[75] Inventors: Golden F. Watts, Delaware; Warren L. Robbins, Westerville, both of Ohio

[73] Assignee: Ashland Oil, Inc., Ashland, Ky.

[21] Appl. No.: 172,012

[22] Filed: Mar. 23, 1988

[51] Int. Cl.$^4$ ................................................ C08G 8/28
[52] U.S. Cl. .................................... 528/137; 528/138; 528/139; 528/143; 528/141; 528/144; 528/145; 528/146; 525/480; 525/504; 525/505; 525/506
[58] Field of Search ................. 528/137, 138, 139, 143

[56] References Cited

U.S. PATENT DOCUMENTS

| | | | |
|---|---|---|---|
| 1,799,816 | 4/1931 | Hole | 525/506 |
| 1,809,732 | 6/1931 | Seebach | 525/506 |
| 2,653,139 | 9/1953 | Sterling | 525/480 |
| 3,230,197 | 1/1966 | Adolphson | 525/506 |
| 3,281,496 | 10/1966 | Rice et al. | 525/480 |
| 3,459,708 | 8/1969 | Stevens | 525/480 |
| 3,914,463 | 10/1975 | Mercurio et al. | 525/480 |
| 4,202,959 | 5/1980 | Henbest et al. | 525/506 |
| 4,205,135 | 5/1980 | Beale et al. | 528/142 |
| 4,568,728 | 2/1986 | Kopac et al. | 528/486 |

Primary Examiner—Morton Foelak
Assistant Examiner—Frederick Krass
Attorney, Agent, or Firm—Mueller and Smith

[57] ABSTRACT

Disclosed is a catalyst system which improves the cure time of acid-catalyzable resole resins while providing extended shelf life thereof. Broadly, the present invention includes a method for formulating an acid-catalyzed, non-aqueous resole resin composition and to the composition itself. The catalyst system comprises an acid catalyst and an oxidizing agent in an amount adequate for cure in at least about the same time that occurs by use of at least twice the amount of said acid catalyst alone. The shelf life of the catalyzed resole resin is greater with the inventive catalyst system than with an equivalent resole resin containing only the acid catalyst in twice the amount.

38 Claims, No Drawings

ACID/OXIDIZER CATALYST SYSTEM FOR STORAGE STABLE, QUICK-CURE PHENOLIC RESINS OF THE RESOLE OR BENZYLIC ETHER RESOLE TYPE

BACKGROUND OF THE INVENTION

The present invention relates to phenolic resins and more particularly to a catalyst system which imparts improved storage stability while retaining rapid cure characteristics.

Phenol or A-stage resins are well known to be prepared from a phenolic part and an aldehyde part which are catalytically reacted. A variety of ionizable catalytic agents are known in the art for the preparation of resole resins, including various alkali metals, alkaline earth metals, and amines. Residual ionizable catalyst permits subsequent heat cure of the resole resin, though at the expense of storage stability. A particular preferred class of resole resins are benzylic ether resins, such as described in U.S. Pat. Nos. 3,409,579 and 3,676,392. Benzylic ether resins can be formed by the reaction of a phenol and an aldehyde under substantially anhydrous conditions at temperatures below about 130° C. In the presence of a catalytic concentration of a metal ion dissolved in the reaction medium. Benzylic ether resins also can be formed using catalysts, which the art has used in forming non-anhydrous resoles, by the aqueous reaction of a phenol and formaldehyde at low temperature, subsequently neutralizing the reaction medium to a pH of about 3.8–5.3 to form insoluble, non-ionizable salts, and then stripping the reaction medium under vacuum at temperatures ranging up to 130° C. The insoluble, non-ionizable salts may be removed by filtration or other common means prior to the dehydration reaction in order to lower the residual ionizability even more. The preparation and characterization of some of these resins is disclosed in greater detail in U.S. Pat. No. 3,485,797. Such catalytic agents include sodium, zinc acetate, lead acetate, lithium naphthenate, lead napthanate, lead oxide, and the like. The benzylic ether resins as formed in the references above also are known as high ortho-ortho resins in that the resin is characterized by ortho-ortho linkages, compared to conventional resole resins, whether anhydrously formed or not, wherein ortho-para linkages predominate. Benzylic ether resins formed during low ionic dehydration possess advantages over conventional resoles in that they are slow to cure with heat. Consequently, they are very stable at room temperature due to the lack of ions present.

Again, the benzylic ether resins can be converted to a cured network in the presence of hydrogen ion-type catalysts, such as typified by strong inorganic and organic acids. Though such benzylic ether resins can be readily cured in the presence of strong acid catalyst, storage stability suffers by dint of such strong acid catalysts. Thus, there is a need in the resole art for maintaining, and even increasing the speed of cure of strong acid-catalyzed resole resins, while improving the shelf life thereof.

BROAD STATEMENT OF THE INVENTION

The present invention is addressed to providing a catalyst system which dramatically can improve the cure time of acid-catalyzable resole resins, while providing extended shelf life thereof. Broadly, the present invention is directed to a method for formulating an acid-catalyzed, nonaqueous resole resin and also to a method for its heat curing. The improvement comprises using a catalyst system comprising an acid catalyst and an oxidizing agent in an amount adequate for cure in at least about the same time that occurs by use of at least twice the amount of said acid catalyst alone. The shelf life of the catalyzed resole resin is greater with the inventive catalyst system than with an equivalent resole resin containing only the acid catalyst in twice the amount. For example, in uncut base form, the shelf stability of 3–5 weeks have been observed under ambient shelf storage conditions, while stability for over three months has been demonstrated when the base resole is cut in organic solvent. At the same time, Sunshine gel times of 1–4 minutes at 121° C. and hot plate cure at 150° C. of 1–15 seconds have been recorded. A variety of modifiers additionally can be added to the basic resole resin formulation for achieving a vareity of special effects.

Accordingly, advantages of the present invention include a catalyst system which imparts improved shelf life to resole resin formulations. Another advantage is that the speed of cure of the shelf stable resole formulations also is hastened. A further advantage is the ability to impart improved shelf stability to standard base-catalyzed resole resin used in the industry for acid curing while maintaining cure speed. These and other advantages will be readily apparent to those skilled in the art based upon the disclosure contained herein.

DETAILED DESCRIPTION OF THE INVENTION

Referring initially to the inventive catalyst system, a variety of conventional strong acids are known to catalytically cure resole resins. These catalysts include, for example, mineral acids including sulfuric acid, phosphoric acid, boric acids, halogen acids such as hydrochloric acid, and sulfonic acids such as para-toluene sulfuric acid; and organic acids including chlorinated acetic acids, oxalic acid, maleic acid, and chlorendic acids. Salts of acids that produce the acid upon heating also can be used, e.g. ammonium sulfate and ammonium chloride. Typical acid concentrations in the past have ranged from about 2 to 20 percent (actives basis). Addition of an oxidizing agent in accordance with the precepts of the present invention, however, permits the level of acid catalyst to be at least cut in half without loss of cure times, thereby increasing shelf life of the catalyzed system by decreasing the presence of destabilizing ions of the acids.

Presently preferred oxidizing agents include potassium permanganate and potassium dichromate. Additional oxidizing agents which may be appropriate include, for example, persulfates, organic peroxides, perborates, and the like, and even mixtures thereof. The proportion of oxidizing agent can range from as low as about 1% on up to 25% or higher of the active acid catalyst. In practical terms, it has been determined that the proportion of oxidizer is determined by the degree of solubility of the oxidizing agent of choice in the resole formulation. For the preferred resoles described herein, the proportion of oxidizing agent typically will not exceed about 5% and often will range from about 2 to 5%.

Referring now to the resole resins, it will be appreciated that resole resins common in acid-catalyzed systems generally are low in water content, i.e. contain less than about 10% water as is standard in resole preparation chemistry. The phenols employed in the formation of the phenolic resins generally include any phenol which has heretofore been employed in the formation of phenolic resins and which are not substituted at either the two ortho positions or at one ortho and the para position, such unsubstituted positions being necessary for the polymerization reaction to occur. Phenols substituted in these positions may be used in lesser quantities (e.g. up to about 30%) to control molecular weight by a capping reaction. Any one, all, or none of the remaining carbon atoms of the phenol ring can be substituted in conventional fashion. The nature of these substituents can vary widely, and it is only necessary that the substituent not interfere in the polymerization of the aldehyde with the phenol at the ortho and/or para positions thereof (except for molecular weight control as noted above). Substituted phenols employed in the formation of the phenolic resins include: alkyl substituted phenols, aryl substituted phenols, cycloalkyl substituted phenols, alkenyl-substituted phenols, alkoxy substituted phenols, aryloxy substituted phenols, and halogen-substituted phenols, the foregoing substituents containing from 1 to 26, and preferably from 1 to 9, carbon atoms.

Specific examples of suitable phenols include: phenol, o-cresole, m-cresole, p-cresole, 3,5-xylenol, 3-4-xylenol, 3,4,5-trimethylphenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol component can include any of the aldehydes heretofore employed in the formation of phenolic resins including, for example, formaldehyde, acetaldehyde, propionaldehyde, furfuraldehyde, and benzaldehyde. In general, the aldehydes employed have the formula R'CHO wherein R' is a hydrogen or hydrocarbon radical of 1–8 carbon atoms. It will be appreciated that some aldehydes, e.g. acetaldehyde and butaraldehyde, improve toughness of the resole resin at the express of lowering the HDT thereof (heat distortion temperatures, American Society for Testing and Materials ASTM D-648).

A variety of modifiers can be cooked into the resole resin in order to improve toughness. These modifiers include, for example, chain terminating phenols, glycols, with or without halogen substitution for additional fire retardency, polyester polyols, alkyl phenols, lactams, polyamides, polyamines, hydroxy-containing acrylates, and the like and mixtures thereof. The proportion of modifier incorporated into the resole resin typically ranges from about 5 to 35 weight percent (based upon the phenol component).

The catalyst used in preparation of the resole can be critical in subsequent use of the resole. As noted above, the preferred catalysts are those which result in the formation of benzylic ether phenols, which are characterized by having a high ortho-ortho content. It will be appreciated, however, that conventional catalyst which result in conventional ortho-para linkage-containing resoles also find wide use with respect to the inventive catalyst system disclosed herein as do the low ionic types discussed above.

Finally, it will be appreciated that a variety of modifiers can be included in the resole formulation, such as fire retardant modifiers typified by melamines, ureas, and dicyandiamides. Additional modifers include fillers, though such fillers should be restricted to neutral or acid fillers in order that the acid/oxidizer system is not spent on neutralization of basic fillers incorporated in the formulation. Reactive modifiers also can be added to the resole resin after it has been formulated. These reactive modifiers include, for example, di and higher polyols, e.g. di or polyhydric phenols, resorcinol, phlorglucinol, and the like. Finally, modifiers to achieve special effects in particular applications may be appropriate, e.g. the addition of polyvinyl acrylate-N-methylol acrylamide latex or the like in oil filter paper saturant uses; various nylons or polyvinyl butyrals, or epoxies for better impact strength in composites.

A final general component for the phenol system is a solvent. A variety of solvents can be used in cutting the phenol resin to a desired solids concentration or viscosity for application. These solvents include a variety of aromatic solvents including benzene, toluene, xylene, ethyl benzene, and the like. Additional solvents include polar solvents such as furfural, furfuryl alcohol (which co-reacts under acid conditions) various Cellsolves, carbitols, ketones, and various alcohols. It was discovered during the course of research on the present invention, however, that shelf stability of the catalyst resole formulation may be improved by utilizing a solvent containing hydroxyl groups. However, the speed of cure can be improved by excluding hydroxy solvents, since it is believed that hydroxy solvents may form intermediates during the curing reaction which require additional time and/or heat in order to push the reaction to completion. This same intermediate reaction occurs during storage but at a much slower rate.

It is not unusual to find acid catalyzed casting resins used in soil stabilization in oil wells, laminating resins for fiberglass reinforcement, as well as a binder resin for molded articles. However, it is unique to find an acid catalyzed resin and an acid catalyst-based system that will exhibit the following characteristics. Because of the low ionic character of the catalyst system, the catalyst system will contribute to the preferred resole resins described herein having a higher dielectric constant than conventional resole resins, suggesting its used as a coating resin for electrostatic grain orientation in coated abrasive uses and in electrical grade laminates where the material exhibits good shelf stability and fast cure at elevated temperature. The unexpectedly low corrosivity on cellulosic paper of the catalyzed resole system suggests its use in areas where standard phenolic resins are used. Because of its fast cure at elevated temperature and low residual acidity, the inventive system may find use in pultrusion formation of fiberglass reinforced sucker rods for oil wells which exhibit higher ultimate temperature performance than polyester sucker rods. The reactivity of the inventive system also makes it a prime candidate for reaction injection molded articles containing fiberglass and other reinforcement.

Because of its low corrosiveness on cellulosic paper, its low hardness when modified, and its fast cure, the inventive catalyzed resole system suggests its use on metal coil coatings used for sanitary can and other filled coatings wherein the fillers are not basic enough to detract from the acid cure.

The acceleration of the acid cure by inclusion of an oxidizing agent suggests that certain free radical foundry resin mechanisms may be improved when sulfur dioxide is used as the gasing system. This statement is based on the fact that $SO_2$ is a sulfurous acid precursor and sulfurous acid is related to sulfuric acid which finds utilization in the catalyst system of the present invention and is known to catalyze ethylenically unsaturated double bond polymerization.

The examples also will show that the present resole system exhibits very low corrosive activity on cellulosic paper, suggesting it as an impregnate for non-woven media and as a laminate of woven and non-woven materials. Finally, the system may find use with fluorocarbon blowing agents in heated molding operations to yield closed cell phenolic foams at lower catalyst levels and with higher boiling fluorocarbons.

The following examples show how the present invention has been practiced, but should not be construed as limiting. In this application, all citations are expressly incorporated herein by reference.

EXAMPLE 1

A resole resin was synthesized from the following ingredients and possessed the following properties:

TABLE 1

| Resole 185 (4745-1) | |
|---|---|
| Ingredient | Amount (wt-parts) |
| Phenol | 100 |
| Formaldehyde (91%) | 47 |
| Zinc acetate | 0.088 |
| Methoxy propylene glycol (solvent) | 33.2 |
| Non-volatile solids | 65% |
| Viscosity (25° C.) | 2,100 cps |
| pH | 3.0 |
| Specific gravity (g/cc) | 1.166 |
| 150° C. Hot Plate Cure (sec) | >600 sec. |

In oreder to evaluate its cure response shelf life, samples of resole 185 were catalyzed with different catalysts, and subjected to cure response and stability testing as follows:

TABLE 2

| 4529-189 No. | Catalyst Type[1] | Catalyst Amt (wt-%) | HP[2] Cure (Sec) | Sunshine[3] Gel (min) | Viscosity (cps at 25° C.)[4] (Days) | | | |
|---|---|---|---|---|---|---|---|---|
| | | | | | 2 | 9 | 21 | 28 |
| A | $H_2SO_4$ $K_2Cr_2O_7$ | 0.15 | 10–12 | 5.7 | 2760 | 4300 | 8550 | 9800 |
| B | $H_2SO_4$ | 0.15 | >200 | >15 | 2400 | 2490 | 2680 | 2800 |
| C | $H_2SO_4$ | 0.50 | 12 | 4.0 | 5500 | >100,000 | — | — |
| D | PTSA | 0.15 | >200 | >15 | 2480 | 2590 | 2785 | 2900 |
| E | PTSA $K_2Cr_2O_7$ | 0.15 | >200 | >15 | — | — | — | — |
| F | PTSA $K_2Cr_2O_7$ | 0.50 | 50 | >15 | 2280 | 2410 | 2620 | 2800 |
| G | PTSA $K_2Cr_2O_7$ | 5.0 | 13 | — | 4500 | 9000 | >100,000 | — |
| H | PTSA | 10.0 | 16 | ~4.5 | 1780 | 6730 | >100,000 | solid |

[1]30% $H_2SO_4$, 5% $K_2Cr_2O_7$; 30% para-toluene sulfonic acid (PTSA), 5% $K_2Cr_2O_7$; Amount (Amt) is for blend.
[2]Hot Plate (HP) cure-150° C.
[3]Sunshine Gel cure-121° C.
[4]Initial viscosity of A-F was 2250 cps The above-tabulated results demonstrate the effectiveness of the novel catalyst system. With reference to the $H_2SO_4$ series of tests, it will be observed that the oxidizing agent permitted use of less than one-third of the acid catalyst to achieve the same quickness of cure (Nos. A and C). Improved stability also was noted for inventive No. A compared to standard No. C. Test No. B shows the effect of the oxidizing agent on cure and stability at equal acid concentrations.

The PTSA data shows it to require a greater concentration than the $H_2SO_4$ catalyst. Still, the enhancement of its catalytic activity by the oxidizing agent is evident from Nos. G and H where cure times are equivalent. Stability for the novel catalyzed system also was better than with an equivalently curing acid-only catalyzed system.

EXAMPLE 2

Use of the zinc catalyst in Example 1 yield a resole high in ortho-ortho linkages. In this example, a conventional base catalyzed resole (ortho-para linkages, catalyst partially neutralized but not removed) was prepared with the following properties.

TABLE 3

| Resole 4745-17 | |
|---|---|
| Ingredient | Amount (wt-parts) |
| Phenol | 100 |
| Formaldehyde (50%) | 81.2 |
| NaOH (20%) | 2.4 |
| HCl (10%) | 1.6 (to adjust pH) |
| MeOH | 1 |
| Non-volatile solids | 79% |
| Viscosity | 3,600 cps |
| pH | 7.4 |
| Specific gravity (g/cc) | 1.229 |
| 150° C. Stroke cure (sec) | 120 |

The resole resin (800 g) was cut to 1985 cps viscosity with methoxy propylene glycol solvent (75 g) and subjected to testing (125 g samples) as described in Example 1.

TABLE 4

| 4745-39 No. | Catalyst* Type | Amt (wt-%) | HP Cure (sec) | Viscosity (cps) Days | | | | |
|---|---|---|---|---|---|---|---|---|
| | | | | Init | 1 | 2 | 3 | 6 |
| A | Control- | None | 120 | 1985 | 2060 | 2900 | 4000 | 4000 |
| B | $H_2SO_4$ $K_2Cr_2O_7$ | 1.6 | 10 | 1250 | 7800 | 15,000 | 24,00 | >100,000 |
| C | $H_2SO_4$ | 0.8 | 65 | 1450 | 3500 | 4200 | 6000 | 7500 |

TABLE 4-continued

| 4745-39 No. | Catalyst* Type Amt | (wt-%) | HP Cure (sec) | Viscosity (cps) Init | Days 1 | 2 | 3 | 6 |
|---|---|---|---|---|---|---|---|---|
| D | K₂Cr₂O₇ H₂SO₄ | 1.6 | 10 | 1150 | 59,000 | >100,000 | — | — |
| E | H₂SO₄ | 0.8 | 65 | 1575 | 5000 | 8000 | 9000 | 15,000 |
| F | PTSA K₂Cr₂O₇ | 3.6 | 11 | 1225 | 3200 | 4500 | 8800 | 17,000 |

*30% H₂SO₄, 5% K₂Cr₂O₇
50% PTSA, 5% K₂Cr₂O₇
30% H₂SO₄

These data show that the presence of the oxidizing agent contributed to improved stability, but apparently did not significantly improve cure speed. However, it should be realized that the resole was base catalyzed so that a certain amount of the acid was needed just to neutralize residue base in the resole. No attempt was made to determine the amount of acid required for this task. Thus, the true effect of the novel catalyst system was not experimentally determined. These data do, however, establish the operability of the novel catalyst system with respect to conventional base catalyzed resole resins.

EXAMPLE 3

The following base resole resins were prepared.

TABLE 5

| Reactive Ingredient | Resole No. (wt-parts) | | | | | |
|---|---|---|---|---|---|---|
| | 182 | 183 | 184 | 188 | 189 | 190 |
| Phenol | 100 | 100 | 100 | 100 | 100 | 100 |
| Nonylphenol | 26.1 | 98.4 | 26.1 | 26.1 | 98.4 | 26.1 |
| Paraformaldehyde* | 52.6 | 67.9 | 52.6 | 52.6 | 67.9 | 52.6 |
| Diethylene glycol | 20.0 | — | — | 20.0 | — | — |
| Tripropylene glycol | — | — | 20.0 | — | — | 20.0 |
| Pb Napthenate | 0.16 | 0.25 | 0.16 | 0.16 | 0.25 | 0.016 |
| Pb Oxide | 0.08 | 0.11 | 0.08 | 0.08 | 0.11 | 0.08 |

*91% paraformaldehyde.

Each of the resins was cut in solvent and catalyzed as follows:

TABLE 6

| Ingredient | Resole/Solvent (wt-parts) | | | | | |
|---|---|---|---|---|---|---|
| | 182 | 183 | 184 | 188 | 189 | 190 |
| Base Resole | 900 | 500 | 600 | 450 | 350 | 400 |
| MeOH | — | — | — | 30 | 50 | 45 |
| Methoxy PG* | 150 | 100 | 120 | — | — | — |
| Catalyst System (wt-%) | 0.15 | 0.15 | 0.15 | 0.15 | 0.15 | 0.15 |

*Methoxy PG is methoxy propylene glycol.

The properties of the catalyzed resoles then were determined.

TABLE 7

| Resole No. | HP Cure (Sec.) | Sunshine Gel (min) | % Non-[1] volatile solids | Specific Gravity (g/cc) | Viscosity (cps) Init. | 30 days |
|---|---|---|---|---|---|---|
| 182 | 22 | 4.0 | 76.5 | 1.136 | 1950 | 8,000 |
| 183 | 22 | 5.5 | 75.4 | 1.084 | 1950 | 5,000 |
| 184 | 23 | 4.5 | 76.7 | 1.128 | 1900 | 10,000 |
| 188 | 18 | 3.6 | 78.4 | 1.126 | 490 | — |
| 189 | 15 | 3.4 | 76.2 | 1.068 | 510 | — |
| 190 | 15 | 3.0 | 77.0 | 1.114 | 510 | — |

TABLE 7-continued

| Resole No. | HP Cure (Sec.) | Sunshine Gel (min) | % Non-[1] volatile solids | Specific Gravity (g/cc) | Viscosity (cps) Init. | 30 days |
|---|---|---|---|---|---|---|
| 4745-17[2] | — | 3.1 | — | — | 3000 | solid |

[1] 3 hours at 135° C.
[2] See Ex. 2 but with water solvent; catalyzed with 1.5 wt-% H₂SO₄ (30%).

Finally, several of the resins were drawn down on clean, mill finished steel (0.030 in. panels) to give a 10 mil wet film (about 0.7 mil dry film). Barcol hardness values 4 hours after cure and again after 24 hours of ambient water soak were taken.

TABLE 8

| Resole No. | 4 Hour Hardness | 24 Hour Water Soak Hardness |
|---|---|---|
| 182 | 50 | 42 |
| 183 | 40 | 30 |
| 184 | 52 | 50 |
| 185 | 70 | 88 |
| 4745-17 (Control) | 80 | 70 |

The foregoing data establishes the inventive catalyst system for a variety of resole resins and the relative equivalency in cure compared to a standard acid only cure resole system. The near equivalency of the low ionic resins to the standard base-catalyzed resin shows that hardness can be achieved without use of large quantities of residual acidity. The inventive resole resins, then, can be electrostatically deposited, for example, on metal and display less corrosive behavior thereon.

EXAMPLE 4

Resole 185 was evaluated as a paper impregnant for making oil or air filters. Control filter paper samples (90 lb/resin) were soaked in the resole for 10 minutes at 300° F. to establish the desired 20% pick-up rate (cured resin weight add-on to the paper). The resole was catalyzed with 1 wt-% of H₂SO₄/K₂Cr₂O₇ (30%/5%) catalyst system. The impregnated paper was cured for 2.5 minutes at 350° F. The following test data was recorded.

TABLE 9

| Test* | Initial | Aged 5 days at 100° F. and 50% R.H. |
|---|---|---|
| Mullens Burst (psi) | | |
| FU | 14 | 14 |
| FD | 14 | 14 |
| Tensile (lb/in) | | |
| MD | 25.5 | 25.8 |
| XD | 17 | 18 |
| Stiffness (mgs) | | |
| MD | 6801 | 7645 |

TABLE 9-continued

| Test* | Initial | Aged 5 days at 100° F. and 50% R.H. |
|---|---|---|
| XD | 4534 | 4445 |
| Stiffness-10' Boiling Water | | |
| MD | 2489 | 2578 |
| XD | 1600 | 1689 |
| % Stiffness Retention | | |
| MD | 36.6 | 33.7 |
| XD | 35.3 | 38.0 |
| Porosity (sec) | | |
| FU | 1.6 | 1.6 |
| FD | 1.6 | 1.6 |

*FU—Felt side up.
FD—Feld side down.
MD—With the grain direction
XD—Across the grain direction
Porosity-time for 100 cc of room temperature air to pass through 0.25 sq. in. sample.

These data demonstrate the relatively acceptable performance of the system as a paper impregnant.

EXAMPLE 5

Resole 190 was evaluated for filter paper impregnation with and without the addition of 35% (solids basis) of a polyvinyl acrylate-N-methylolacrylamide latex modifier. The catalyst system (0.15%, solids basis) was 30% $H_2SO_4$/2% $K_2Cr_2O_7$. The paper was 90 lb/ream oil filter paper. The saturaing solvent was methanol. The following results were recorded.

TABLE 10

| | Resole 190 | | |
|---|---|---|---|
| | A | B | C |
| Modifier | None | Latex | Latex |
| Pickup Weight (10' at 300° F.) | 19% | 18% | 18% |
| Cure Conditions | 10' at 300° F. 5' at 350° F. | 10' at 350° F. | 5' at 350° F. |
| Aging Paper Properties | 16 hr. at 70° F. and 50% R.H. | | |
| Mullens (psi) | 13.6 | 20.4 | 18.8 |
| Tensiles (lb/in) | | | |
| MD | 21.8 | 29.5 | 22.5 |
| XD | 11 | 23.2 | 14.2 |
| Stiffness (mgs) | | | |
| MD | 4756 | 7957 | 7823 |
| XD | 3378 | 4667 | 4445 |
| % Stiffness | 57% | 31% | 32% |

TABLE 10-continued

| | Resole 190 | | |
|---|---|---|---|
| | A | B | C |
| Retention after 10 min. boiling water (MD & XD Avg) | | | |
| Porosity (secs/100 cc air) | 1.8 | 1.8 | 1.8 |

Again, the relative efficacy of another resole catalyzed with the novel catalyst system is demonstrated.

EXAMPLE 6

A resole resin was synthesized from the following ingredients.

TABLE 11

| Ingredient | Resole 192 (4529-79) Amount (wt-parts) |
|---|---|
| Phenol | 879 |
| Paraformaldehyde (91%) | 413 |
| Pb napthenate | 1.25 |
| PB oxide | 0.60 |
| Methanol (Solvent) | 142 |
| % Non-volatile solids | 76.0 |
| Viscosity | 565 cps |
| Specific gravity (g/cc) | 1.165 |
| HP Cure (150° C.) | 5–10 sec. |
| Sunshine Gel (121° C.) | 2.5 min. |

The resole was cut to about 9% n.v. solids with a solvent blend of methanol/methyl ethyl ketone (90/10 wt) to form Solution A. A final pick-up of 19.1–19.6% was noted when the paper (90 lb/ream) was cured at 300° F. for 10 minutes. The final pH of the saturating solution was 1.6.

Solution B was made by adding an 8–10% n.v. methanol solution of PVA-N methylolacrylamide latex to Resole 192 (20–21% solids basis of latex). This solution then was cut to 9% n.v. using the noted solvent blend. A cured pick-up of 20% of the pH 5.0 solution for 90 lb/ream paper was recorded.

Papers were saturated, cured, and aged overnight at 70° F. and 50% R.H. Additional papers also were aged for 5 days at 100° F. and 50% R.H. The following results were recorded.

TABLE 12

| System | OVERNIGHT AGING | | | | | | | | | |
|---|---|---|---|---|---|---|---|---|---|---|
| | I | II | III | IV | V | VI | VII | VIII | IX | X |
| Saturating Solution | A | A | A | A | B | B | B | B | B | |
| pH Adj. of Sat. Sol.* | No | No | No | No | No | No | No | No | Adj. to 1.6 | |
| Precure Air Dry | No | No | No | No | No | No | 30' | No | No | 30' |
| Cure Conditions | 10' at 350° F. | 5' at 350° | 3' at 350° F. | 1' at 350° F. | 5' at 350° F. | 3' at 350° F. | 1' at 350° F. | 1' at 350° F. | 3' at 350° F. | 1' at 350° F. |
| Cured Properties | | | | | | | | | | |
| Mullens (psi) | 8.5 | 14.5 | 14 | 27.5 | 23 | 21.5 | 34 | 42.5 | 13 | 13.5 |
| Tensile (lb/in) | | | | | | | | | | |
| MD | 25.5 | 34.5 | 27 | 27 | 30.5 | 31 | 37 | 36 | 25.5 | 36 |
| XD | 13 | 16 | 11 | 15 | 18.5 | 21 | 24 | 24 | 15 | 23 |
| Stiffness (mg) | | | | | | | | | | |
| MD | 9246 | 7468 | 6401 | 5690 | 8801 | 9690 | 9023 | 8623 | 9246 | 8890 |
| XD | 4267 | 5156 | 3956 | 2400 | 4978 | 4801 | 4756 | 5023 | 4712 | 5156 |
| % Stiffness Retention after 10 min. in Boiling Water (MD & XD Avg) | 46 | 40 | 35 | 24 | 40 | 33 | 23 | 28 | 50 | 38 |
| Porosity | | | | | | | | | | |

TABLE 12-continued

| System | OVERNIGHT AGING | | | | | | | | | |
|---|---|---|---|---|---|---|---|---|---|---|
| | I | II | III | IV | V | VI | VII | VIII | IX | X |
| (secs/100 cc air) | 1.4 | 1.5 | 1.6 | 1.6 | 1.7 | 1.8 | 1.9 | 1.9 | 1.9 | 1.8 |

*resole 192 was made with .15% b.o.s. of a 30% H₂SO₄/2% K₂Cr₂O₇ solution post added to the resin; this solution also was used for pH adjustment when performed.

TABLE 13

| | 5 Day Aging | | | | | |
|---|---|---|---|---|---|---|
| | I | II | III | IV | V | VI |
| Mullens (psi) | 13 | 14 | 14 | 31 | 23 | 27 |
| Tensile (lb/in) | | | | | | |
| MD | 34 | 33 | 22 | 31.5 | 35.5 | 32.5 |
| XD | 16 | 15 | 12 | 14.5 | 17 | 17.5 |
| Stiffness (mgs) | | | | | | |
| MD | 8090 | 9912 | 5779 | 5245 | 9245 | 9512 |
| XD | 5156 | 4711 | 3556 | 2534 | 4534 | 4978 |
| % Stiffness Retention after 10 min. boiling water (MD & XD Avg.) | 44 | 42 | 42 | 26 | 38 | 36 |
| Porosity (secs/100 cc air) | 1.6 | 1.6 | 1.6 | 1.7 | 1.7 | 1.8 |

These results set forth in Tables 12 and 13 demonstrate that the aging did not degrade the paper.

EXAMPLE 7

The heat histories required in impregnating the paper in the previous examples were longer than desired. In an attempt to speed up the cure of the dilute resole impregnating solutions, phloroglucinol was blended with the resole at 5% (solids basis). A 0.30% (solids basis) of H₂SO₄/K₂Cr₂O₇ (30%/2%) was used with an 80/20 blend of methanol/methyl ethyl ketone saturating solvent. The paper stock was 60 lb/ream filter paper. The resole was 192M which was 192 (Example 6) with diethylene glycol (10 parts per 100 parts phenol) cooked in. The following results were recorded.

TABLE 14

| System | A | B |
|---|---|---|
| Resin | Resole 192M | Resole 192M |
| Modifier | None | Phloroglucinol 5% b.o.s. |
| Pickup Weight (10' at 300° F.) | 17% | 17% |
| Cure conditions | 10' Air Dry 1' at 350° F. | 10' Air Dry 1' at 350° F. |
| Aging | 16 hr. at 70° F. and 50% R.H. | |
| Paper Properties | | |
| Mullens (psi) | 23 | 20 |
| Tensile (lb/in) | | |
| MD | 18.9 | 20.8 |
| XD | 13 | 16.5 |
| Stiffness (mgs) | | |
| MD | 3023 | 3289 |
| XD | 1778 | 1867 |
| % Stiffness Retention after 10' boiling water (MD & XD Avg) | 23% | 28% |
| Porosity (secs/100 cc air) | .8 | .8 |

The results do not appear to demonstrate the needed cure speed increase desired by addition of the noted triol, but do demonstrate an increase in moisture resistance performance.

EXAMPLE 8

As a paper impregnant, the catalyzed resoles displayed quite acceptable performance, but required a significant heat history. It was theorized that the methanol solvent was participating in the formation of reaction intermediates which were displayed during the final curing reaction to release the methanol. It followed that non-alcoholic solvents should ameliorate the heat history factor. Thus, samples of Resole 184 (Table 5) were cut in methanol and acetone in order to verify the foregoing.

The samples were catalyzed with varying proportions (based on solids of resole) of H₂SO₄ (30%) and K₂Cr₂O₇ (2%) catalyst system. A 10% solids concentration of each sample was used to impregnate felt paper (15% pick-up weight) and then heated at 350° F. The degree of dryness (solvent evaporation) and cure was determined by feeling the impregnated samples as a function of heating time with the following results.

TABLE 15

| Sample 4745-51 No. | Solvent | Catalyst Conc. (wt-%) | Time (min) | Dryness & Cure Observation |
|---|---|---|---|---|
| A | Methanol | 0.2 | 1 | Paper moist |
| | | | 2 | Paper tacky |
| | | | 3 | Paper dry-no cure |
| | | | 4 | Paper dry-no cure |
| | | | 5 | Cure |
| B | Acetone | 0.2 | 1 | Paper dry |
| | | | 2 | Cure |
| C | Methanol | 1.0 | 1 | Paper tacky |
| | | | 2 | Cure |
| D | Acetone | 1.0 | 0.5 | Cure |
| E | Methanol | 3.0 | 1 | Cure |
| F | Acetone | 3.0 | 15–20 sec. | Cure |

The improved speed of cure using the non-alcoholic solvent certainly is demonstrated.

The performance of the samples then was adjudged from impregnated 90 lb/ream filter paper (15% pick-up weight).

TABLE 16A

| Sample 4745-51 No. | Grain[1] | Gurley Stiffness | | |
|---|---|---|---|---|
| | | Init. (mg) | 10 min. Boiled Water (mg) | Stiffness Retention (%) |
| A | m | 4178 | 1245 | 29.8 |
| | x | 2267 | 711 | 31.4 |
| B | m | 6579 | 1956 | 29.7 |
| | x | 3600 | 1067 | 29.6 |
| C | m | 4712 | 1956 | 41.5 |
| | x | 3023 | 1067 | 35.3 |
| D | m | 5645 | 1422 | 25.2 |
| | x | 2534 | 800 | 31.6 |
| E | m | 4178 | 1956 | 46.8 |
| | x | 2578 | 1156 | 44.8 |
| F | m | 6712 | 2134 | 31.8 |
| | x | 3556 | 978 | 27.5 |

TABLE 16B

| | Grain | Tensile (pound/inch) |
|---|---|---|
| A | m | 20 |
| | x | 11 |
| B | m | 21.5 |
| | x | 13 |
| C | m | 15.5 |
| | x | 11.0 |
| D | m | 16.0 |

TABLE 16B-continued

|   | Grain | Tensile (pound/inch) |
|---|---|---|
|   | x | 13.0 |
| E | m | 12.3 |
|   | x | 8.5 |
| F | m | 20 |
|   | x | 15.8 |

TABLE 16C

|   | Side[2] | Porosity[3] (sec) |
|---|---|---|
| A | FU | 1.7 |
|   | FD | 1.7 |
| B | FU | 1.6 |
|   | FD | 1.7 |
| C | FU | 1.7 |
|   | FD | 1.6 |
| D | FU | 1.6 |
|   | FD | 1.6 |
| E | FU | 1.7 |
|   | FD | 1.7 |
| F | FU | 1.7 |
|   | FD | 1.6 |

TABLE 16D

|   | Side[2] | Mullins Burst (psi) |
|---|---|---|
| A | FU | 17 |
|   | FD | 18 |
| B | FU | 18 |
|   | FD | 20 |
| C | FU | 10.5 |
|   | FD | 12.0 |
| D | FU | 16.0 |
|   | FD | 20.0 |
| E | FU | 8.0 |
|   | FD | 8.0 |
| F | FU | 13.0 |
|   | FD | 18.0 |

[1]m—with grain
x—cross-grain
[2]FU—Felt side up
FD—Felt side down
[3]Time for 100 cc of air (room temperature) to pass through 0.25 sq. in. of paper.

The foregoing data establishes the relative equivalency in performance between the methanol solvent and acetone solvent samples. Relatively good performance values are seen displayed. No corrosiveness on the cellulose fibers was observed despite the relatively low pH (about 5) of the samples.

EXAMPLE 9

In this example, Resole 192M of Example 7 again was evaluated alone and with 5% (solids basis) phloroglucinol addition. Also, the proportion of oxidizing agent was 2% in samples A and B, and 10% in samples C and D. The catalyst system used 1% total of 30% $H_2SO_4$ and the noted $K_2Cr_2O_7$. The saturating solvent used was acetone. Again, an increase in cure speed of the dilute impregnating solution was the goal.

TABLE 17

| System | A | B | C | D |
|---|---|---|---|---|
| Modifier | None | Phloroglucinol | None | Phloroglucinol |
| Pickup weight | 20% | 21.5% | 20.5% | 20.6% |
| Air dry | | 10 minutes | | |
| Cure conditions | | 30″ at 350° F. | | |
| Aging | | 16 hr. at 70° F. and 50% R.H. | | |
| Paper Properties | | | | |
| Mullens (psi) | 16.0 | 13.5 | 19.0 | 13.0 |
| Tensile (lb/in) | | | | |
| MD | 26.3 | 26.8 | 35.5 | 33.8 |
| XD | 16.3 | 17.0 | 25.0 | 21.8 |
| Stiffness (mgs) | | | | |
| MD | 7379 | 10668 | 8312 | 8179 |
| XD | 3778 | 4667 | 5023 | 4890 |
| % Stiffness Retention after 10 min. boilding wter, MD & XD Avg. | 35% | 32% | 28% | 32% |
| Porosity | 1.7 | 1.6 | 1.6 | 1.6 |

As before, the triol did not seem to significantly improve cure speed at the lower oxidizer level tested. The increased oxidizer level, however, did improve all properties except for water resistance.

EXAMPLE 10

In this example, the efficacy of the novel catalyst system in hot box foundry core operations was evaluated. The following systems were tested.

TABLE 18

|   | Resin No. (wt-parts) | | | | |
|---|---|---|---|---|---|
| Ingredient* | A | B | C | D | E |
| Sand | 100 | 100 | 100 | 100 | 100 |
| Binder | 4529-191 | 4745-1 | 4745-1 | 4745-17 | 4745-17 |
| (2% based on sand) | | | | | |
| Catalyst | 30% $H_2SO_4$/ | 30% $H_2SO_4$/ | 30% $H_2SO_4$ | 30% $H_2SO_4$ | 30% $H_2SO_4$ |
| (1% based on binder) | 2% $K_2Cr_2O_7$ | 2% $K_2Cr_2O_7$ | | 2% $K_2Cr_2O_7$ | |

*Sand is Wedron 540 washed silicon sand (slightly basic).
4529-191 is Resole 185 of Example 1 made with $K_2Cr_2O_7$ catalyst rather than zinc catalyst in the polymer synthesis.
4745-1, see Example 1.
4745-17-Resole of Example 2 but with water solvent.

The hot box operation used a 0.5 sec. blow time, a 60 sec. dwell time, and a 450° F. temperature. The following tensile strengths were measured for fresh mix, mix that had aged for 6 hours (6 Hr. Bench), and mix that had aged for 24 hours (24 Hr. Bench) before use.

TABLE 19

|   | Tensile Strength (lb/in) | | | | |
|---|---|---|---|---|---|
| Time* | A | B | C | D | E |
| Fresh Mix | | | | | |
| Hot | 25 | 49 | 30 | 55 | 51 |
| R.T. | 227 | 368 | 291 | 405 | 370 |
| 24 Hr. | 182 | 244 | 185 | 384 | 342 |
| 6 Hr. Bench | | | | | |
| Hot | 26 | 47 | 38 | 53 | 44 |
| R.T. | 212 | 321 | 219 | 439 | 433 |
| 24 Hr. | 190 | 255 | 219 | 442 | 429 |
| 24 Hr. Bench | | | | | |
| Hot | <10** | <10** | <10** | <10** | None |
| R.T. | 60 | 84 | 71 | 25 | None |
| 24 Hr. | 47 | 59 | 63 | 10 | None |

*Hot is immediately after demolding.
R.T. typically is about 1 hour after demolding.
24 Hr. is 24 hours after demolding.
**Sand mix is shot for all practical purposes.
Sand mix is very sticky and cores are very friable.

These results demonstrate the efficacy of the novel catalyst system in hot box operations. Comparable tensile strengths and longer bench life are exhibited by the inventive catalyst system compared to an acid only system. This is true even for a conventional acid catalyzed water-based resole resin. Note that Resin D exhibited a bad odor, but that Resins A and B exhibited no odor.

We claim:

1. In a method for heat curing a non-aqueous benzylic ether resole resin, the improvement which comprises using a catalyst system comprising an acid catalyst and an oxidizing agent in an amount adequate for cure in at least about the same time that occurs by use of at least twice the amount of said acid catalyst alone, the shelf life of said catalyzed resole resin being greater with said catalyst system than with said at least twice the amount of said acid catalyst alone.

2. The method of claim 1 wherein said acid catalyst is a mineral acid or an organic acid.

3. The method of claim 1 wherein the proportion of acid catalyst used with said oxidizing agent ranges from about 1 to 10% by weight of said resole resin.

4. The method of claim 2 wherein said acid catalyst used is selected from the group consisting of sulfuric acid, hydrochloric acid, phosphoric acid, a boric acid, para-toluene sulfonic acid, a chlorinated acetic acid, oxalic acid, maleic acid, a chlorendic acid, an acid salt that releases an acid upon heating, and mixtures thereof.

5. The method of claim 1 herein the oxidizing agent used in said catalyst system is present in an amount of about 1 to 25 percent by weight of said acid catalyst.

6. The method of claim 1 wherein said oxidizing agent is selected from the group consisting of a persulfate, an organic peroxide, a chromate, a permanganate, and mixtures thereof.

7. The method of claim 6 wherein the oxidizing agent used is selected from the group consisting of potassium permanganate and potassium dichromate.

8. The method of claim 1 wherein said resole resin contains less than about 10 percent by weight of water.

9. The method of claim 1 wherein said resole resin is prepared by reacting under anhydrous conditions a phenol and an aldehyde under resole forming conditions in the presence of a catalyst selected from the group consisting of an alkali metal, an alkaline earth metal, an amine, a metal ion dissolved in the reaction medium, and mixtures thereof.

10. The method of claim 1 wherein said resole resin is prepared by reacting a phenol and an aldehyde under aqueous resole reaction conditions in the presence of a catalyst selected from the group consisting of an alkali metal, an alkaline earth metal, an amine, a divalent metal ion dissolved therein, and mixtures thereof; neutralizing the reaction product to a pH of about 3.8–5.3; and then stripping off water to make the resole resin non-aqueous.

11. A heat-curable, acid-catalyzable, non-aqueous benzylic ether resole resin comprising:
 (a) a non-aqueous benzylic ether resole resin; and
 (b) a catalyst system comprising an acid catalyst and an oxidizing agent in an amount adequate for cure in at least about the same time that occurs by use of at least twice the amount of said acid catalyst alone, the shelf life of said catalyzed resole resin being greater with said catalyst system than with said at least twice the amount of said acid catalyst alone.

12. The resole resin of claim 11 wherein said acid catalyst is a mineral acid or an organic acid.

13. The resole resin of claim 11 wherein the proportion of acid catalyst used with said oxidizing agent ranges from about 1 to 10% by weight of said resole resin.

14. The resole resin of claim 12 wherein said acid catalyst used is selected from the group consisting of sulfuric acid, hydrochloric acid, phosphoric acid, a boric acid, para-toluene sulfonic acid, a chlorinated acetic acid, oxalic acid, maleic acid, a chlorendic acid, an acid salt that releases an acid upon heating, and mixtures thereof.

15. The resole resin of claim 11 wherein the oxidizing agent used in said catalyst system is present in an amount of about 1 to 25 percent by weight of said acid catalyst.

16. The resole resin of claim 11 wherein said oxidizing agent is selected from the group consisting of a persulfate, an organic peroxide, a chromate, a permanganate and mixtures thereof.

17. The resole resin of claim 16 wherein the oxidizing agent used is selected from the group consisting of potassium permanganate and potassium dichromate.

18. The resole resin of claim 11 wherein said resole resin contains less than about 10 percent by weight of water.

19. The catalyzed resole resin of claim 11 which additionally comprises a non-aqueous solvent selected from the group consisting of an aromatic solvent, an ester, an ether, a ketone, an alcohol, and mixtures thereof.

20. In a method for heat curing in the presence of an acid catalyst a base catalyzed, non-aqueous resole resin, the improvement for extending the shelf life of said resole resin which comprises using a catalyst system consisting essentially of an acid catalyst and an oxidizing agent in an amount adequate to substantially maintain the time that it takes said resole to cure without the presence of said oxidizing agent, the shelf life of said catalyzed resole being greater with said catalyst system by the presence of said oxidizing agent.

21. The method of claim 20 wherein said acid catalyst is a mineral acid or an organic acid.

22. The method of claim 20 wherein the proportion of acid catalyst used with said oxidizing agent ranges from about 1 to 10% by weight of said resole resin.

23. The method of claim 21 wherein said acid catalyst used is selected from the group consisting of sulfuric acid, hydrochloric acid, phosphoric acid, a boric acid, para-toluene sulfonic acid, a chlorinated acetic acid, oxalic acid, maleic acid, a chlorendic acid, an acid salt that releases an acid upon heating, and mixtures thereof.

24. The method of claim 20 wherein the oxidizing agent used in said catalyst system is present in an amount of about 1 to 25 percent by weight of said acid catalyst.

25. The method of claim 20 wherein said oxidizing agent is selected from the group consisting of a persulfate, an organic peroxide, a chromate, a permanganate, and mixtures thereof.

26. The method of claim 25 wherein the oxidizing agent used is selected from the group consisting of potassium permanganate and potassium dichromate.

27. The method of claim 20 wherein said resole resin contains less than about 10 percent by weight of water.

28. The method of claim 20 wherein said resole resin is prepared by reacting under anhydrous conditions a phenol and an aldehyde under resole forming conditions in the presence of a catalyst selected from the group consisting of an alkali metal, an alkaline earth metal, an amine, a metal ion dissolved in the reaction medium, and mixtures thereof.

29. The method of claim 20 wherein said resole resin is prepared by reacting a phenol and an aldehyde under aqueous resole reaction conditions in the presence of a catalyst selected from the group consisting of an alkali metal, an alkaline earth metal, an amine, a divalent metal ion dissolved therein, and mixtures thereof.

30. A heat-curable, acid-catalyzable, non-aqueous resole resin composition consisting essentially of:
(a) a base-catalyzed, non-aqueous resole resin; and
(b) a catalyst system comprising an acid catalyst and an oxidizing agent in an amount adequate to substantially maintain the time that it takes said resole resin to cure without the presence of said oxidizing agent, the shelf life of said catalyzed resole resin composition being greater with said catalyst system by the presence of said oxidizing agent.

31. The resole resin of claim 30 wherein said acid catalyst is a mineral acid or an organic acid.

32. The resole resin of claim 30 wherein the proportion of acid catalyst used with said oxidizing agent ranges from about 1 to 10% by weight of said resole resin.

33. The resole resin of claim 31 wherein said acid catalyst used is selected from the group consisting of sulfuric acid, hydrochloric acid, phosphoric acid, a boric acid, para-toluene sulfonic acid, a chlorinated acetic acid, oxalic acid, maleic acid, a chlorendic acid, an acid salt that releases an acid upon heating, and mixtures thereof.

34. The resole resin of claim 30 wherein the oxidizing agent used in said catalyst system is present in an amount of about 1 to 25 percent by weight of said acid catalyst.

35. The resole resin of claim 30 wherein said oxidizing agent is selected from the group consisting of a persulfate, an organic peroxide, a chromate, a permanganate, and mixtures thereof.

36. The resole resin of claim 35 wherein the oxidizing agent used is selected from the group consisting of potassium permanganate and potassium dichromate.

37. The resole resin of claim 30 wherein said resole resin contains less than about 10 percent by weight of water.

38. The catalyzed resole resin of claim 30 which additionally comprises a non-aqueous solvent selected from the group consisting of an aromatic solvent, an ester, an ether, a ketone, an alcohol, and mixtures thereof.

* * * * *